United States Patent
Matzner et al.

(10) Patent No.: US 9,310,460 B2
(45) Date of Patent: Apr. 12, 2016

(54) METHOD AND DETECTOR FOR SEARCHING A TRANSMITTER

(71) Applicants: Rolf Matzner, Munich (DE); Felix Greimel, München (DE); Hannah Jörg, München (DE)

(72) Inventors: Rolf Matzner, Munich (DE); Felix Greimel, München (DE); Hannah Jörg, München (DE)

(73) Assignee: Ortovox Sportartikel GmbH, Taufkirchen (DE)

( * ) Notice: Subject to any disclaimer, the term of this patent is extended or adjusted under 35 U.S.C. 154(b) by 694 days.

(21) Appl. No.: 13/627,712

(22) Filed: Sep. 26, 2012

(65) Prior Publication Data

US 2013/0080103 A1    Mar. 28, 2013

(30) Foreign Application Priority Data

Sep. 26, 2011  (EP) .................................... 11182732
Oct. 14, 2011  (EP) .................................... 11185278

(51) Int. Cl.
*G01S 5/02* (2010.01)
*A63B 29/02* (2006.01)

(52) U.S. Cl.
CPC ................ *G01S 5/02* (2013.01); *A63B 29/021* (2013.01); *G01S 2205/006* (2013.01)

(58) Field of Classification Search
CPC .... A63B 29/021; G01S 2205/006; G01S 5/02

USPC ........................................................... 702/94
See application file for complete search history.

(56) References Cited

U.S. PATENT DOCUMENTS

| | | | |
|---|---|---|---|
| 6,487,516 B1 * | 11/2002 | Amorai-Moriya | ............ 702/152 |
| 2005/0270234 A1 | 12/2005 | Wolf et al. | |
| 2006/0128354 A1 | 6/2006 | Carle et al. | |

FOREIGN PATENT DOCUMENTS

| | | |
|---|---|---|
| EP | 1577679 A1 | 3/2005 |
| EP | 2065722 A1 | 11/2008 |

OTHER PUBLICATIONS

European Search Report 11185278.6-2220 dated Mar. 29, 2012.

* cited by examiner

*Primary Examiner* — Bryan Bui
(74) *Attorney, Agent, or Firm* — Jura C. Zibas; Gregory N. Brescia; Wilson, Elser, Moskowitz, Edelman & Dicker, LLP.

(57) ABSTRACT

The present invention relates to a method for searching a transmitter. Therein, the vectorial magnetic field strengths of the field emitted by the transmitter are detected for at least a first and a second measurement point relative to a reference axis of the detector carried by a searcher. Furthermore, at least one orientation difference ($\phi 2-\phi 1$) between the first and the second measurement point is detected. Based on certain assumptions, the vectorial magnetic field strengths are calculated and subsequently a function (E) of an error vector (g) representing the difference between the calculated and the measured vectorial magnetic field strengths is numerically minimized for determining an updated position vector. Moreover, the invention relates to a corresponding detector.

16 Claims, 4 Drawing Sheets

Fig.1
(SdT)

METHOD AND DETECTOR FOR SEARCHING A TRANSMITTER

CROSS-REFERENCE TO RELATED APPLICATION

This application claims foreign priority under 35 U.S.C. §119 to European Patent Application No. 11 182 732.5, filed Sep. 26, 2011, as well as European Patent Application 11 185 278.6, also filed Oct. 14, 2011, both of which are hereby incorporated herein by reference in their entirety.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable.

STATEMENT REGARDING PRIOR DISCLOSURES BY THE INVENTOR OR A JOINT INVENTOR

See IDS.

BACKGROUND

The present invention relates to a method for searching a transmitter with a detector, which includes at least a first and a second antenna for receiving a transmit signal of the transmitter, wherein the transmit signal includes transmit pulses emitted with a certain transmit pulse period, as well as a position determining device for determining at least one orientation variation of the detector, comprising the following steps: a) detecting the vectorial magnetic field strengths of the field emitted by the transmitter in at least two dimensions for at least a first and a second measurement point relative to a reference axis of the detector carried by a searcher; and b) detecting at least one orientation difference between at least the first and the second measurement point. Moreover, it relates to a detector for searching a transmitter including at least a first and a second antenna for receiving a transmit signal of the transmitter, a position determining device for determining at least one orientation variation of the detector, and a processing device coupled at least to the first and the second antenna and the position determining device, wherein the processing device is configured to detect the vectorial magnetic field strengths of the field emitted by the transmitter in at least two dimensions for at least a first and a second measurement point relative to a reference axis of the detector carried by a searcher as well as an orientation difference of the detector between at least the first and the second measurement point.

In the following, the present invention is explained in more detail using the example of an avalanche victim detector. However, it is applicable to other types of detectors without restriction, for example in order to search for persons in a destroyed building.

Figure 1:
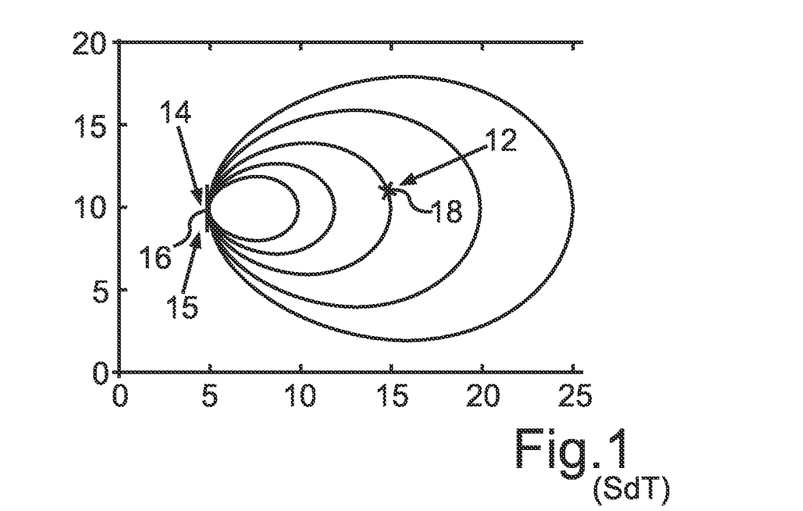
FIG. 1 in schematic illustration the searching process in a searching method known from the prior art.

The technology of today's avalanche victim detectors is based on tracking a magnetic field line. In this connection, FIG. 1 shows the position of a searcher 12 carrying an avalanche victim detector 18, as well as the position of a buried victim 14 carrying a transmitter 15 with a transmitting antenna 16. As it is clearly recognizable, the searcher 12, if he is not on the axis of the transmitting antenna 16 by chance, is thus always guided in a—sometimes wide—curve to the transmitter 15, that is to the buried victim 14. The magnetic field lines are the curves emanating from the transmitting antenna 16 illustrated in FIG. 1.

This approach has the following disadvantages:
The searcher has to travel a farther way than actually required.
Only the direction of the field line (field vector) is available along the curved guide path. Due to the curvature, the actual position of the transmitter cannot be simply inferred from it. Thus, the searcher cannot know where—related to his own position—the transmitter is actually located. A searching strategy is not possible in this sense.
The measurement of the direction and field strength is always local. Two measurements in different positions cannot be related to each other. Thus, improvement of the accuracy by inclusion of prior measurements is not possible.
The following measurement cannot be inferred from the direction and distance of prior measurements. In case of loss of the transmit signal, for example as a result of superposition in the multi-search, thus, the search cannot be simply continued based on a target already calculated before.

In the range of the fine search, that is in the immediate environment of the buried victim, it is necessary to determine the perpendicular projection of the buried victim to the snow surface (projection point) on the one hand, also his burial depth on the other hand. Since the vertical orientation of the transmitting antenna is generally unknown, near the transmitter, usually in a distance of two to three meters, the direction indication is turned off. Then, the searcher changes his searching strategy. He does no longer follow the directional arrow, but rather maintains the current orientation of the detector. By slow movement back and forth on the one hand as well as left/right movement on the other hand, he searches the position with the least distance indication corresponding to the maximum field strength. For determining the depth, usually, a linear or square combination of the field strength measured in three axes is used today.

This approach is associated with several disadvantages:
The search for the maximum field strength requires high concentration and causes the highest time portion of the entire searching operation.
The linear or square combination of the field strengths only results in an approximate depth estimate.
The projection point can only be approximately correctly determined with existing methods with oblique transmitting antenna.

Another known approach is in determining the position of the searcher in the geostationary coordinate system by means of GPS. Thereby, a known position in the geostationary coordinate system can be associated with each vectorial field measurement. If sufficient measured values are present, the location of the transmitter can also be calculated in the stationary coordinate system.

Therein, the drift of the GPS measurement caused by system is disadvantageous. During the period of a search, the measured location coordinate drifts by several meters. As a result, the location of the transmitter cannot be estimated with the accuracy required for the rescue of the buried victim.

DE 10 2008 016 137 A1 solves this problem by employing stationary reference stations in addition to the searching receiver variable in location, which also receive the GPS signal and are all subject to the same drift. Thereby, the movement of the searcher relative to the reference stations can be determined free of drift. In result, this method corresponds to the application of differential GPS.

However, in practice, carrying and applying the reference stations is a considerable disadvantage. Applying the reference stations in the searching field alone causes an expenditure of time, which cannot compensated for any more thereafter by an accelerated search.

A further possibility of establishing a relation between a geostationary coordinate system and the magnetic field is in measuring and evaluating lateral and rotating movements of the detector. Thereby, the relative positional variation with respect to the geostationary coordinate system between individual field measurements can be determined such that in the ideal case each position can be represented except for a global (identical for all positions) displacement and rotation in the geostationary coordinate system. As above explained, the position of the transmitter (with the same displacement and rotation) can correspondingly be calculated.

In this approach, it is disadvantageous that the calculation of a translational variation from acceleration data requires double integration. Even least errors in the initial conditions (initial speed) result in constantly increasing positional errors already after short time.

As a variant, the orientation (the angle) could be determined from the measurement of the earth's magnetic field. However, this does not solve the problem of instability of the translational estimation.

BRIEF SUMMARY OF THE INVENTION

Therefore, the object of the invention is in developing a generic method and a generic detector, respectively, such that reduction of the searching operation is allowed.

This object is solved by a method having the features of claim 1 as well as by a detector having the features of claim 16.

The present invention is based on the realization that the above mentioned object can be solved if it is managed to determine the relative position of the transmitter to the searcher in a geostationary coordinate system from one or more vectorial measurements of the magnetic field. According to the invention, the position of the transmitter relative to the position of the searcher is to be determined from several measurements combined with each other, which are made at measurement points during the movement of the searcher. In practice, the measurement points are not freely selectable, but result from the fact that the transmit signal is pulsed and a measurement of the magnetic field at the location of reception is possible approximately once per second. In the two-dimensional search, the position is to be determined according to distance and plane angle, in the three-dimensional search according to distance and spatial angle or equivalently according to distance, plane angle and burial depth. At each measurement point, the vectorial magnetic field strengths of the field emitted by the transmitter—according to statement of task two- or three-dimensional—with respect to the detector carried by the searcher as well as the angle between the longitudinal axis of the detector and a reference direction are available as the measurement variables.

In particular, the invention is based on the realization that a position vector representing the location of at least one measurement point relative to the location of the transmitter, can be particularly conveniently determined if at least one geometric relation is assumed between the first and the second measurement point. Only in this manner, one or more additional relations between the position vectors in the measurement points and the orientation difference between the measurement points arise. A position vector contains the coordinates of a measurement point related to the transmitter. In this manner, measurements at different positions can be related to each other, in particular, most generally, previous measurements can be taken into account in order to determine an optimized guide path to the transmitter. By the optimization of the guide path, both the distance to be traveled by the searcher and the time required for the searching operation are significantly reduced, whereby the chance of survival or a buried person considerably increases.

According to the invention, therefore, the following further steps are provided: c) assuming at least one geometric relation between at least the first and the second measurement point; d) assuming initial values for the position vector in at least two dimensions in at least the first and the second measurement point; e) assuming an orientation of a transmitting antenna of the transmitter related to a first presettable reference direction; f) calculating the vectorial magnetic field strengths of the field emitted by the transmitter in at least two dimensions for at least the first and the second measurement point based on the assumption according to the steps c) to e) as well as the detected orientation difference according to step b); g) calculating an error vector between the vectorial magnetic field strengths detected in step a) and the vectorial magnetic field strengths calculated in step f); and h) numerically minimizing a function of the error vector calculated in step g) by altering the assumptions made in the steps c) to e) until a presettable tolerance threshold for the function of the error vector is undercut.

For determining the burial depth, it is particularly preferred that in step c) the vectorial magnetic field strength of the field emitted by the transmitter is detected in three dimensions, in step d) the initial values of the position vector are assumed in three dimensions, in step e) the orientation of at least the first and the second antenna is assumed related to two different reference directions, and in step f) the vectorial magnetic field strengths are calculated in three dimensions. If the first and the second antenna are rigidly connected to each other, the assumption of an orientation of the first antenna is sufficient. Then, the orientation of the second antenna results from it.

Even if in step b) detection of an orientation difference between at least the first and the second measurement point—for example with the aid of a rotational rate sensor and subsequent integration—is sufficient, it is particularly simple with regard to known position determining devices if in step b) the orientation of the detector is detected for at least the first and the second measurement point related to a second presettable reference direction. From it, then, the orientation difference can be determined in particularly simple manner.

It has proven particularly advantageous if in step h) a function of the error vector is the quadratic or Euclidean norm. For such a function, in the mathematics, suitable methods are available such that application within a method according to the invention is possible without great effort.

A further improvement of the searching operation with respect to distance and time can be achieved if the error vector established in step g) contains additional components for considering the deviation of the path curve traveled by the searcher between at least the first and the second measurement point from the geometric relation according to step c) and these additional components enter the function minimized in step h).

A preferred embodiment of a method according to the invention is characterized by the following further steps: i) repeating the steps a) to h) for at least one further block with at least two measurement points, and j) iterative improvement of the position vector resulting for the at least one further block by combining with the position vector of at least one preceding block. Although the transmitter location can basically already be determined by evaluating the first block with at least two measurement points, the method according to the invention presents the possibility of combining the position vectors resulting from further measurement blocks with at least two measurement points with the position vectors determined based on preceding blocks. This means, the more blocks are combined with each other, the more exactly the transmitter location can be determined. This can be effected iteratively during the searching operation, such that the searcher makes only minimum deviations from the direct path between detector and transmitter. Thereby, the searching process is further optimized.

Particularly preferably, the steps i) and j) are repeated with each new block of measurement points such that cumulated intermediate results of previous blocks are integrated in the minimization of the error vector for the at least one further block, wherein the respectively preceding position vector is iteratively improved in step j).

In a preferred development, accordingly, in step h) an iterative optimization method, preferably a Gauss-Newton method or a Levenberg-Marquardt method, and in step j) an extended Kalman filter is applied. The application of such optimization methods to preset error vectors is sufficiently known from the mathematics, in particular from the numerical optimization.

The blocks may be disjoint or non-disjoint. In the selection of disjoint blocks, the requirements to the computing capacity of the detector can be reduced, while more iterations are possible with non-disjoint blocks with regard to the traveled searching distance, which results in a further optimization of the searching operation.

The geometric relation assumed in step c) can be at least one of the following: c1) the measurement points are on a trajectory, which is independent of the pathway of the magnetic field emitted by the transmitter, in particular on a straight line, a circle or a parabola; or c2) the measurement points are on a magnetic field line of the magnetic field emitted by the transmitter.

In this connection, it is particularly preferred if the measurement points of respective blocks are on a magnetic field line during a first phase, wherein during a second phase subsequent to the first phase, the measurement points of respective blocks are on a trajectory, in particular a straight line, the direction of which results from the result of minimization of the error vector in step h). Therein, the first phase is preferably kept until sufficient measurements for a sufficiently accurate estimation of the transmitter location are present. Then, the searcher can be directly sent into the direction of the calculated target, wherein the estimation process can now be continued on a straight line piece and be refined with further measurement points. With each further measurement point, an improved estimation of the direction can be obtained and thus an improved direction to the target can be indicated.

It is particularly advantageous if a search direction is displayed for the searcher on the display unit of the detector during the search, which corresponds to the geometric relation assumed in step c). Thereby, it can be ensured that the searcher largely complies with the geometric relation assumed in step c), which constitutes a basis of the method according to the invention. The better the searcher complies with this restriction, the more accurate the achieved calculation results are.

In particular during the search, that is after sufficient measurements have been made, it is preferred if a search direction is displayed for the searcher on the display unit of the detector, which points to the direction of the transmitter according to the position vector determined in step h). In this manner, the searcher is guided to the transmitter on the shortest possible and optimum path at the respective time.

It has proven particularly advantageous if the vectorial magnetic field strengths are acquired and processed in Cartesian coordinates, while the position vectors are preferably acquired and processed in polar coordinates. Although other representations are possible, the simultaneous equations arising herein are very clear and can be processed with little computational effort.

Preferably, in step b) the orientation difference or the orientation of the detector is detected by means of a compass and/or by means of a rotational inertial system. The error propagation from initial value errors is tolerable in the present invention due to the short interpolation period of the order of one second. Thereby, the method is basically also applicable to bridge longer intervals, in which current measured values are not available, by interpolation.

Furthermore, it is preferred that the position vector is combined with further location information, in particular by GPS measurements. This is readily possible in a method according to the invention and allows further improvement of the searching process, for example by the mentioned iterative optimization methods. For example, the deviation between the position values and the position obtained by means of GPS can be included in the error vector according to g) as a further component.

Particularly preferably, in a further step k), the target of the search is perspectively displayed on a display unit. Therein, the target can be two-dimensionally displayed on the display unit if the searcher is in a first presettable distance range from the target, wherein the target is three-dimensionally displayed on the display unit, if the searcher is in a second presettable distance range, which in particular corresponds to a lower distance from the target than the first presettable distance range. In the first presettable distance range, the perspective realistically represents the view that the searcher would have if he could see the buried victim or his projection point to the snow surface—using the example of a victim buried in an avalanche. Therein, the snow surface can be graphically indicated by target rings. In larger distance, if the display of the burial depth does not make any sense, the snow is opaquely (intransparently) represented. Then, the searcher only sees a marking of the projection of the position of the buried victim to the represented snow surface. In contrast, in the second presettable distance range, the burial depth is displayed such that terrain unevennesses no longer have any significant influence on the actual depth. Preferably, in the second presettable distance range, a burial depth of the transmitter is displayed on the display unit.

Further advantageous embodiments are apparent from the dependent claims.

The preferred embodiments presented with respect to the method according to the invention and the advantages thereof correspondingly apply to the detector according to the invention, if applicable.

BRIEF DESCRIPTION OF THE DRAWINGS

In the following, embodiments of the present invention are now described in more detail with reference to the attached drawings. There show.

DETAILED DESCRIPTION OF THE INVENTION

The following explanations describe an embodiment of a method according to the invention for searching a transmitter with a detector, which includes at least a first and a second antenna for receiving a transmit signal of the transmitter, wherein the transmit signal includes transmit pulses emitted with a certain transmit pulse period, as well as a position determining device for determining at least one orientation variation of the detector. The reference characters introduced with reference to FIG. 1 are further used as far as identical and identically acting elements are concerned.

As measurement variables, there are available in the two-dimensional case for each measurement point i a magnetic field vector $H_i$ with two—preferably orthogonal—components relative to the reference axis of the detector, and an orientation $\phi_i$ (angle) of the reference axis of the detector related to any reference direction A global unknown, that is identically unknown for all of the measurement points, is the orientation $\alpha$ of the transmitting antenna of the transmitting apparatus related to a—preferably the same—reference direction. To this, in each measurement point, the two components of the two-dimensional position vector $p_i$ of the i-th measurement point relative to the position of the transmitter are added as further unknowns. Therein, the position vector represents the location of the i-th measurement point relative to the location of the transmitter.

If one disregards the orientation of the longitudinal axis of the detector, with two measurement points i=1 and i=2, five unknowns $p_1$, $p_2$ (each two components) and $\alpha$ are opposed to only four measured values $H_1$ and $H_2$ (also two components). With each further measurement point i, two further unknowns $p_i$ and two measured values $H_i$ are added, such that the problem is basically underdetermined.

According to the invention, this problem is solved in that one introduces geometric restrictions for the movement of the searcher. They result in one or more additional relations between the positions $p_i$ and the measurement variable $\phi_i$. With a single such additional relation, the simultaneous equations are completely determined. As the restrictions in this sense, there can preferably be used:

The orientation of the detector in both (or several) measurement points has to correspond to the direction of the straight line connecting the two measurement points. This is typically present if the searcher walks a straight way and carries the measurement apparatus in front of him without rotating or pivoting it. In practice, this is achieved in that the display of the detector dictates a constant direction of movement "straight forward".

Generally, instead of a straight line, any arbitrary trajectory (path curve) a priori known can be preset for the movement of the searcher. For a simple establishment of the simultaneous equations, this trajectory should be parameterizable.

The searcher follows a magnetic field line. This is inherently the case in the today generally used searching process. In practice, the detector outputs the direction of the measured field strength vector related to the own apparatus longitudinal axis in each measurement point.

The relative position vectors $p_i$ can be represented in any coordinate system, preferably in polar coordinates with the location of the transmitter as the origin.

For the estimation of the position of the transmitter, the knowledge of the orientation $\phi$ of the detector is required. To this, it is sufficient to determine the orientation (direction) relative to any geostationary coordinate system—that is a constant offset against the cardinal direction north does not matter. This position information can for example be obtained from the measurement of the earth's magnetic field (compass) or from a rotational inertial system (rotational rate sensors). In the latter case, the current direction is defined as the sum of all of the angular variations with respect to a reference direction to an arbitrarily selected starting point of time.

For the following example for approximate determination of the transmitter position from the measurement variables in two measurement points, a polar coordinate system $(r_i, \theta_i)$ with the origin at the transmitter location is used for the position vectors. The magnetic field at the receiver location, that is at the respective measurement point, is described in a Cartesian coordinate system $(u_i, v_i)$ fixedly associated with the detector.

Figure 2:
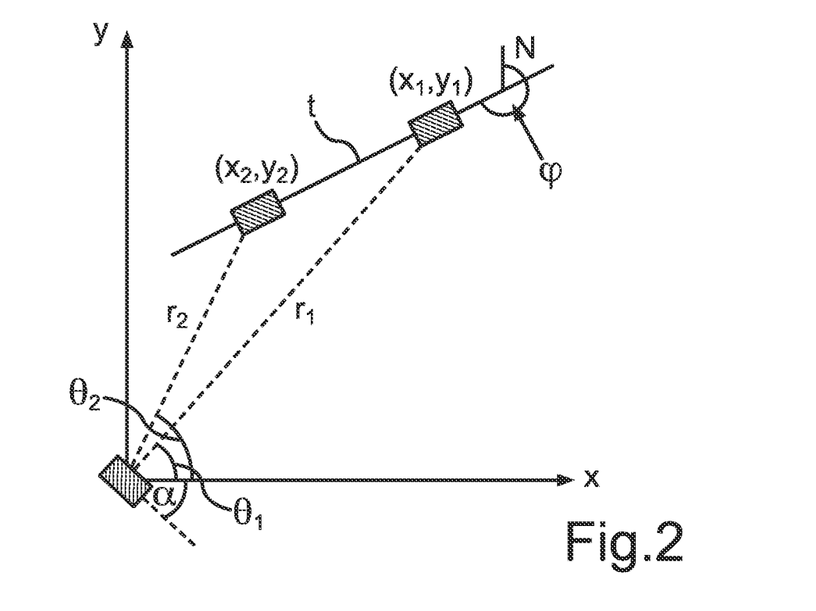
FIG. 2 a schematic illustration for introducing various variables in an embodiment of a searching method according to the invention.

FIG. 2 shows in schematic illustration the denotation of the variables in the case of a straight line as the geometric restriction selected between the first and the second measurement point. N represents the direction north, t denotes the distance between measurement point 1 and measurement point 2.

The components of the measured values $H_i$ (i=1, 2) are denoted as v and u components. Therein, v denotes the longitudinal direction of the detector and u denotes a direction orthogonal thereto. From the Maxwell equations and from the projection of the field vector to the searching antennas of the detector oriented in the u and v direction, respectively, the following field equations result:

$$H_i = \begin{pmatrix} Hv_i \\ Hu_i \end{pmatrix} = \begin{pmatrix} \frac{-iA}{8\pi r_i^3}(3\sin(\varphi_i + \alpha + 2\theta_i) + \sin(\varphi_i - \alpha)) \\ \frac{-iA}{8\pi r_i^3}(3\cos(\varphi_i + \alpha + 2\theta_i) + \cos(\varphi_i - \alpha)) \end{pmatrix},$$

$$p_i = \begin{pmatrix} r_i \\ \theta_i \end{pmatrix}$$

iA is the product of current through the winding of the transmitting antenna and the cross-section thereof. In the special case that the measurement points 1 and 2 are on a straight line, it is required, by estimation of the vector $$z=(r_1,\theta_1,r_2,\theta_2,\alpha,t)^T$$

to minimize the following square error:

$$E = \frac{1}{2}\sum_{i=1}^{6}\|g\|^2,$$

wherein g is the residual or error function vector, the components of which indicate the deviations of the measurements from the field equations and the error of the linear equation, respectively—evaluated on the current estimation z.

For g, it applies:

$$g = \begin{pmatrix} Hv_1^{calc} - Hv_1^{meas} \\ Hu_1^{calc} - Hu_1^{meas} \\ Hv_2^{calc} - Hv_2^{meas} \\ Hu_2^{calc} - Hu_2^{meas} \\ r_2\cos\theta_2 - r_1\cos\theta_1 - t\sin\varphi \\ r_2\sin\theta_2 - r_1\sin\theta_1 - t\cos\varphi \end{pmatrix}$$

The superscript "meas" serves for distinguishing actually measured variables from variables recalculated from the estimated current state, which are identified by the label "calc". The orientation $\varphi$ is always measured, here, the addition "meas" is omitted for the sake of simplicity.

One can describe the geometric association in polar coordinates instead of the parametrization. In addition, in both implementations, the geometric relation can be substituted in the field equations. Thereby, g is reduced to four components, but the equations are considerably more complicated. In the case of other restrictions, they are substituted in $g_5$ and $g_6$ and otherwise equivalently treated.

There results the following non-linear adjustment problem:

Start: $z^0$ arbitrary, n=0
Evaluation: $g^n=g(z^n)$, $\nabla g^n=\nabla g(z^n)$
Solve (with QR decomposition): $(\nabla g^n \nabla g^{nT})\cdot\Delta z^n=\nabla g^n g^n$
Update: $z^{n+1}=z^n+\sigma^k\Delta z^n$, $\sigma^k$ positive step size
Test: if $E(z^{n+1})<tol \rightarrow STOP$, else n=n+1

The non-linear adjustment problem is numerically solved with a Gauss-Newton method as above described. Therein, the residue is minimized based on the least squares method. The non-linear adjustment problem is replaced with a sequence of linears, the normal equations of which are solved by the QR method. If the problem is badly conditioned, for example due to noisy data, it can be reasonable to apply a Levenberg-Marquardt method, an attenuated variant of the Gauss-Newton method, instead of the Gauss-Newton method. To the mentioned methods, see for example Nocedal, Jorge; Wright Stephen J.: "Numerical Optimization", New York: Springer, 1999.

The above described method can be applied both planar for determining the projection point of the transmitter to the searching plane (snow surface) and spatially for complete determination of the coordinates of the transmitter (including the burial depth).

In the last-mentioned case, the unknowns $p_i$ and the measurement variables $H_i$ are each to be extended by a third component. Furthermore, a further global unknown $\beta$ is added as an inclination of the transmitting antenna about a second axis—preferably in the perpendicular plane. $\beta$ therefore describes the vertical orientation of the transmitting antenna. What was said above to the general underdetermination and the solution with the aid of geometric restrictions also apply to the spatial case.

Since the burial depth is to be understood as the distance between transmitter and snow cover, it can only be reasonably determined and displayed in relative proximity to the buried victim in non-planar terrain. Thus, a spatial estimation (and the display of the result) is only reasonable and necessary in the range of a distance below about 8 m.

Avalanche victim detectors transmit approximately one pulse per second. Thus, the calculated position information of the transmitter output to the user can only be renewed once per second. Upon movement of the searcher it then virtually jumps in second intervals. If one would know the movement of the searcher (translational and rotational), thus, the display could be adapted to the movement of the searcher without jolting also between the transmit signals. Herein, rotational position variations can be detected by vectorial measurement of the earth's magnetic field or inertially, for example with rotational rate sensors. Translational movements would be detectable with the aid of an inertial system, for example acceleration sensors. The error propagation from initial value errors is tolerable due to the short interpolation period of the order of one second.

This method is basically also applicable to bridge longer intervals, in which current measured values are not available, by interpolation. For example, this occurs in the temporary superposition of signals of multiple transmitters.

If besides the position data $p_i$ determined with the described method, further location information $d_i$, for example from GPS measurements, is available, thus, the result of both estimations $d_i$ and $p_i$ can be further improved by known optimization methods, for example Kalman filters.

For the searching process, initially, one of the variants of a geometric restriction can be selected until enough measurements could be performed for a sufficiently exact estimation. Then, the searcher is directly sent into the direction of the calculated target and thus again follows a straight line (the first case of geometric restriction). The estimation process can now be continued along the straight line and the target estimation thus can increasingly be refined.

Figure 3:
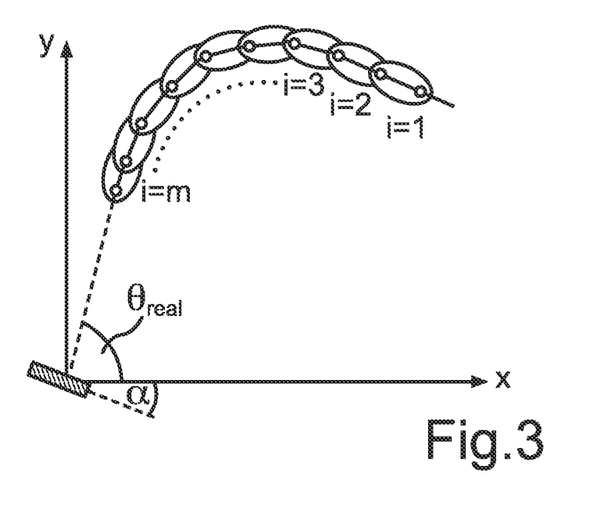
FIG. 3 a schematic illustration for using measurement points, which are always in groups on a straight line, in a searching method according to the invention.

In this connection, FIG. 3 shows the use of measurement points, which are always in groups on a straight line, firstly four, then each two (overlapping) until the recalculation of the estimation direction.

The original estimation of the transmitter position is continuously improved by new measurements. For this purpose, the measurement points are divided in blocks. Preferably, a block is composed of two measurement points. The blocks can be disjoint with respect to the measurement points or overlap each other respectively in at least one measurement point.

As soon as several blocks are integrated in the estimation, the estimation vector can be extended by the newly added variables, or newly added variables are transformed in an intermediate step into existing variables with the aid of the linear equations.

Based on the existing estimation, the new measurement data and previous measurements and estimations, now, the transmitter position estimation is iteratively improved. This occurs in the example with the aid of an extended Kalman filter—an incremental optimization method based on the Gauss-Newton method for two measurement points. To this, two measurement points each constitute a block. As already above described, the transmitter position estimation problem can be solved for each block separately. Instead of a Kaman filter, in particular, data fusion or a particle filter can also be applicable.

If a new block, that is two new measured values $H_i$, is added, an update of the variable vector and thus of the position of the transmitter is determined with the aid of the incremental Gauss-Newton method From it, the new walking direction $\phi_{new}$ results. The nonlinear adjustment problem is now min E=min $\Sigma \|g_i\|$, wherein here the index i passes through the blocks.

In detail:

1. Start:                                    $z^0$ arbitrary, n = 0, i = 1
2. Inner Iteration:

Evaluation:                              $g_i^n = g_i(z_i^n)$, $\nabla g_i^n = \nabla g_i(z_i^n)$
                                           $H_i = \lambda H_{i-1} + \nabla g_i^n + \nabla g_i^{nT}$
Solve (with QR decomposition):    $H_i \cdot \Delta z_i^n = \nabla g_i^n g_i^n$
Update:                                    $z_{i+1}^n = z_i^n + \sigma^k \Delta z_i^n$, $\sigma^k$ positive step size
                                           if i = m → 3.
                                           else: i = i + 1 → 2.

3. Test:

if $E(z_m^n) < \text{tol} \rightarrow \text{STOP} \rightarrow \varphi_{new} = \frac{3}{2\pi} - \theta_2$                      else: $z_0^{n+1} = z_m^n$, n = n + 1, i = 1 → 2.

wherein $\lambda$ is a weighting factor for the preceding estimation. Thereby, it is controlled how much the old measured value enters the iteration process compared to the new one. Due to the weighting factor, thereby, it is ensured that the measured value the less enters, the more it dates back. The references →3. and →2., respectively, mean that i is correspondingly set and subsequently it is continued with 2. (inner iteration) or 3. (test).

The information from the preceding blocks enters the update determination of the current block. The variable vector is already updated during the passage through the data set (inner iteration). These passages are repeated until the error falls below a certain tolerance bound.

The fact that the update is calculated both based on the new information, but the information of the previous blocks also enters, causes that individual noisy or unusable data does not too much distort the positional estimation. The update already after passage through a data block and not only at the end of the data set yields a further saving of computing time.

The method according to the invention allows division of the searching process in four phases: signal search, coarse search, target search, fine search.

The target search is new with respect to the established searching process. Here, it is approached the buried victim in a straight line, but without considering depth information.

Different from the previous searching process, manual search of the field strength maximum is no longer required in the fine search. Rather, the searcher can be directly guided to the correct position above the buried victim and be informed about the burial depth.

The possibility of determining the position of the searcher relative to the position of the buried victim, also requires another presentation on a display unit for the searcher than known up to know especially in fine search. The previous presentation mainly aims at the communication of a current instruction of action. Thus, in the coarse search, if it is mainly required to follow the magnetic field line, the direction currently to be observed is displayed (besides the distance) as the substantial feature. In the fine search, the main focus is on manually finding the distance minimum, correspondingly, only the current distance is usually displayed here without direction.

In the case of the new searching process, the presentation of the prospective progress of the entire further search takes the place of the current instruction of action. Thus, the target is displayed with all of the information relevant in the respective phase. In the two-dimensional case, the actual position of the target related to the current position of the searcher is associated with it, in the three-dimensional case, the burial depth is added.

Figure 4:
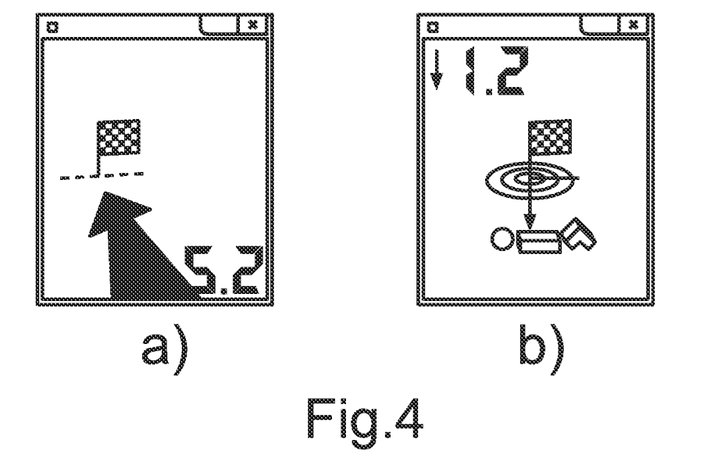
FIG. 4 a schematic illustration as it is displayed on a display unit in larger distance (FIG. 4*a*) as well as in lower distance (FIG. 4*b*) in a method according to the invention.

With reference to FIG. 4a, accordingly, in larger distance, the snow is opaquely represented. Furthermore, a searching direction is displayed as well as a distance indication. In the near range, see FIG. 4b, the snow is transparently represented with a representation of the burial depth to scale. Moreover, the depth is indicated in meters.

Figure 5:
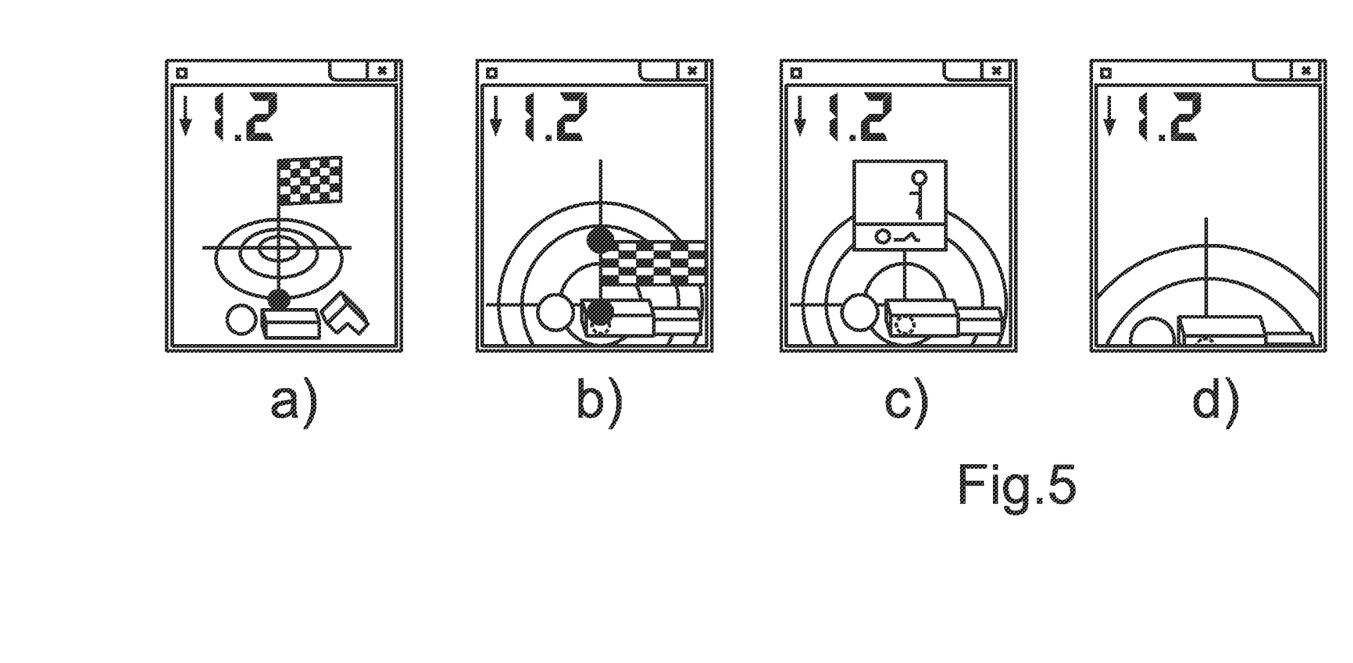
FIG. 5 in schematic illustration the display on a display unit in a method according to the invention in fine search in the near range (FIG. 5*a*), just before the target (FIG. 5*b*), in optimum position (FIG. 5*c*) as well as if the searcher has gone too far (FIG. 5*d*)

In case of the fine search, the presentation can include a reticle. The searcher can be a point, which has to be registered with the center of the reticle. In this connection, FIG. 5 shows the corresponding displays on the display device in the fine search: FIG. 5a shows the near range, in which the depth can be estimated and displayed. FIG. 5b shows the situation just before the target, while FIG. 5c shows the optimum position, in which the search is finished and it can be probed. FIG. 5d shows the situation, if it has been gone too far, that is the buried victim exits from the lower image edge.

A substantially clearer, perspective, three-dimensional presentation is also possible, which shows the buried victim (approximately) to scale in the measured burial depth under the snow from the viewing direction of the searcher. Therein, it is essential:

The perspective realistically represents the view that the searcher would have if he could see the buried victim or his projection point to the snow surface.

The snow surface is graphically indicated, in the example by the target rings, see FIG. 4b to this.

The burial depth is only displayed in close proximity, see FIG. 4b to this, such that terrain unevennesses do no longer have any significant influence on the actual depth.

In larger distance, if the display of the burial depth does not make any sense, the snow is opaquely (intransparently) represented, see FIG. 4a to this. The searcher then only sees a marking of the projection of the position of the buried victim to the presented snow surface. This projection point can for example be represented with a target flag.

In low distance (from about 10 m), the snow is transparently represented, see FIG. 4b to this. One sees the buried victim lying under the snow. The burial depth can be represented to scale.

Figure 6:
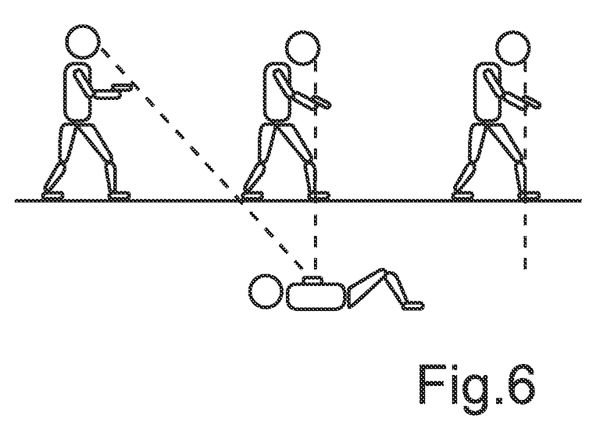
FIG. 6 a schematic illustration for selecting the correct perspective upon overrunning the target.

The viewing direction is selected corresponding to the respective situation. With reference to FIG. 6, the perspective remains directed perpendicularly downwards upon overrunning the buried victim, one does not view rearwards without completely turning around. Thereby, the realistic presentation according to FIG. 5 results. In FIG. 5, there is also shown the indication for probing (pinpoint location), see FIG. 5c, upon reaching the target position.

What is claimed is:

1. A method for searching for a transmitter with a detector and a position determining device for determining at least one orientation variation of the detector, the detector comprising at least a first and a second antenna for receiving a transmit signal of the transmitter, wherein the transmit signal includes pulses emitted with a certain transmit pulse period, the method comprising the following steps:
a) detecting the vectorial magnetic field strengths ($Hv_1^{meas}$, $Hu_1^{meas}$, $Hv_2^{meas}$, $Hu_2^{meas}$) of the field emitted by the transmitter in at least two dimensions for at least a first and a second measurement point relative to a reference axis of the detector carried by a searcher; and
b) detecting at least one orientation difference ($\phi_2-\phi_1$) between at least the first and the second measurement point;
wherein the method further comprises the following steps for determining a position vector ($p_i$) representing the location of at least one measurement point relative to the location of the transmitter;
c) assuming at least one geometric relation between at least the first and the second measurement point;
d) assuming initial values for the position vector ($p_i$) in at least two dimensions in at least the first and the second measurement point;
e) assuming an orientation ($\alpha$) of a transmitting antenna of the transmitter related to a first presettable reference direction;
f) calculating the vectorial magnetic field strengths ($Hv_1^{calc}$, $Hu_1^{calc}$, $Hv_2^{calc}$, $Hu_2^{calc}$) of the field emitted by the transmitter in at least two dimensions for at least the first and the second measurement point based on the assumptions according to the steps c) to e) as well as the detected orientation difference ($\phi_2-\phi_1$) according to step b);
g) calculating an error vector (g) between the vectorial magnetic field strengths detected in step a) and the vectorial magnetic field strengths calculated in step f); and
h) numerically minimizing a function (E) of the error vector (g) calculated in step g) by altering the assumptions made in steps c) to e) until a presettable tolerance threshold (tol) for the function (E) of the error vector (g) is undercut.

2. The method according to claim 1,
wherein in step a) the vectorial magnetic field strength of the field emitted by the transmitter is acquired in three dimensions;
in step d) the initial values of the position vector ($p_i$) are assumed in three dimensions;
in step e) the orientation ($\alpha$, $\beta$) of at least the first and second antenna related to two different reference directions is assumed; and
in step f) the vectorial magnetic field strengths are calculated in three dimensions.

3. The method according to claim 1,
wherein in step b) the orientation of the detector is detected for at least the first and the second measurement point related to a second presettable reference direction (N).

4. The method according to claim 1,
wherein in step h) a function (E) of the error vector (g) is the quadratic or Euclidean norm thereof.

5. The method according to claim 1,
wherein the error vector established in step g) contains additional components for considering the deviation of the path curve traveled by the searcher between at least the first and the second measurement point from the geometric relation according to step c).

6. The method according to claim 1, further compromising:
i) repeating the steps a) to h) for at least one further block with at least two measurement points; and
j) iteratively improving the position vector ($p_i$) resulting for the at least one further block by combining with the position vector ($p_i$) of at least one preceding block.

7. The method according to claim 6,
wherein the steps i) and j) are repeated with each new block of measurement points such that cumulated intermediate results of previous blocks are integrated in the minimization of the error vector (g) for the at least one further block, wherein in step j) the respectively preceding position vector ($p_i$) is iteratively improved.

8. The method according to claim 6, further comprising:
k) perspective display of the target of the search on a display unit.

9. The method according to claim 8,
wherein the target is two-dimensionally displayed on the display unit, if the searcher is in a first presettable distance range from the target,
wherein the target is three-dimensionally displayed on the display unit, if the searcher is in a second presettable distance range, which in particular has a lower distance from the target than the first presettable distance range.

10. The method according to claim 9,
wherein the second presettable distance range, a burial depth of the transmitter is displayed on the display unit.

11. The method according to claim 1,
wherein in the steps h) an iterative optimization method, preferably a Gauss-Newton method or a Levenberg-Marquardt method, and in step j) an extended Kalman filter is applied.

12. The method according to claim 1,
wherein the geometric relation assumed in step a) is at least one of the following:
a1) the measurement points are on a trajectory independent of the pathway of the magnetic field emitted by the transmitter, in particular on a straight line, a circle or a parabola;
a2) the measurement points are on a magnetic field line of the magnetic field emitted by the transmitter.

13. The method according to claim 12,
wherein during a first phase, the measurement points of respective blocks are on a magnetic field line, wherein during a second phase subsequent to the first phase, the measurement points of respective blocks are on a trajectory, in particular a straight line, the direction of which results from the result of minimization of the error vector (g) in step h).

14. The method according to claim 1,
wherein during the search, a searching direction is displayed for the searcher on the display unit of the detector, which corresponds to the geometric relation assumed in step c), or
which points to the direction of the transmitter according to the position vector ($p_i$) determined in step h).

15. The method according to claim 1,
wherein in step b) the orientation difference ($\phi_2-\phi_1$) or the orientation of the detector (18) is detected by means of a compass and/or by means of a rotational inertial system.

16. A detector for searching for a transmitter comprising:
at least a first and a second antenna for receiving a transmit signal of the transmitter,
a position determining device for determining at least one orientation variation of the detector, and
a processing device coupled at least to the first and the second antenna and to the position determining device,
wherein the processing device is configured to detect the vectorial magnetic field strengths of the field emitted by the transmitter in at least two dimensions for at least a first and a second measurement point relative to a reference axis of the detector carried by a searcher, as well as an orientation difference ($\phi_2-\phi_1$) by the detector between at least the first and the second measurement point;

wherein the detector further includes for determining a position vector ($p_i$) representing the location of at least one measurement point relative to the location of the transmitter:

a storage device, in which the following is stored:

an assumed geometric relation between at least the first and the second measurement point;

assumed initial values for a position vector ($p_i$) in at least two dimensions in at least the first and the second measurement point, wherein the position vector ($p_i$) represents the position of the detector relative to the transmitter; as well as an assumed orientation ($\alpha$) of a transmitting antenna of the transmitter related to a first presettable reference direction;

wherein the processing device is configured to calculate the vectorial magnetic field strengths of the field emitted by the transmitter in at least two dimensions for at least the first and the second measurement point based on the assumptions stored in the storage device as well as an orientation difference ($\phi_2-\phi_1$) detected by means of the position determining device;

wherein the processing device is further configured to calculate a function (E) of an error vector (g) between the vectorial magnetic field strengths detected using at least the first and the second antenna and the calculated vectorial magnetic field strengths and to numerically minimize it by altering the assumptions stored in the storage device until a presettable tolerance threshold (tol) for the error vector (g) is undercut.

* * * * *